Aug. 31, 1954     E. H. WOODHULL ET AL     2,688,090
NONDISPERSION ANALYZER
Filed Nov. 20, 1952                            2 Sheets-Sheet 1
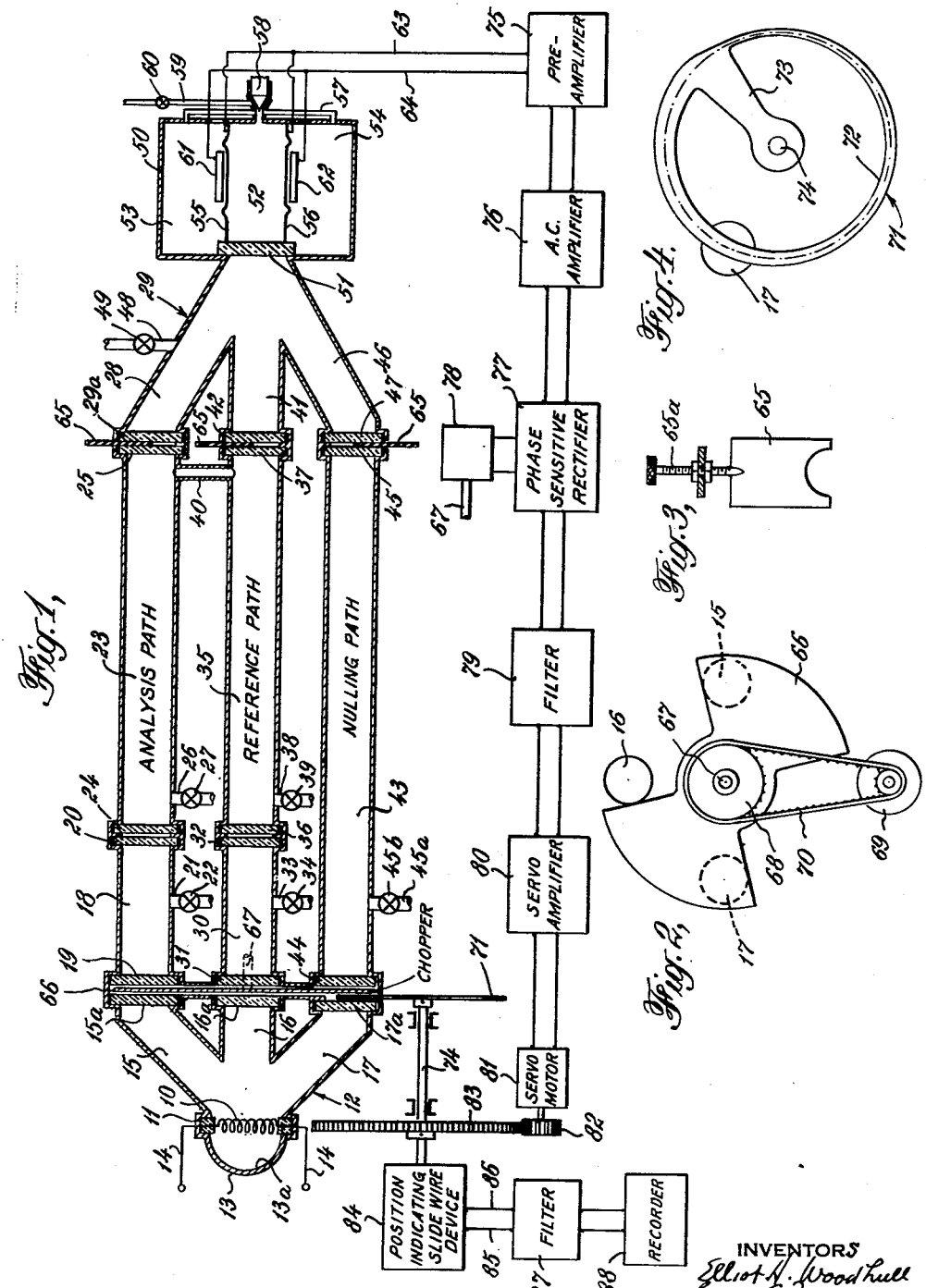
INVENTORS
Elliot H. Woodhull
BY Glenn E. Tisdale
Pennie Edmonds Morton Barrows Taylor
ATTORNEYS

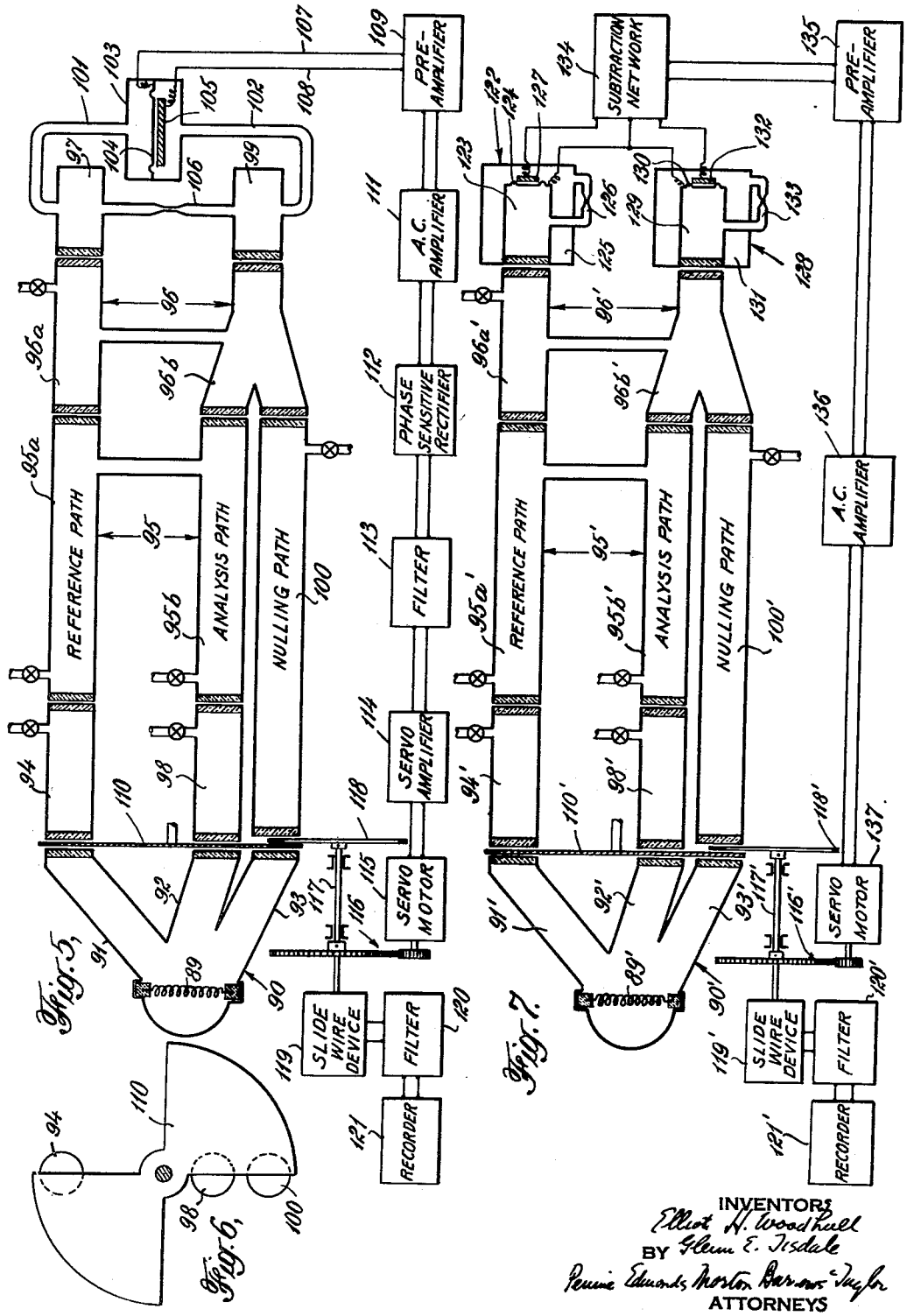

Patented Aug. 31, 1954

2,688,090

UNITED STATES PATENT OFFICE 2,688,090

NONDISPERSION ANALYZER

Elliot H. Woodhull, Norwalk, and Glenn E. Tisdale, Noroton, Conn., assignors to The Perkin-Elmer Corporation, Norwalk, Conn., a corporation of New York Application November 20, 1952, Serial No. 321,662

11 Claims. (Cl. 250—43.5)

This invention relates to radiation instruments for analytical purposes and is concerned more particularly with a novel instrument which embodies the invention disclosed in the co-pending application of Williams, Serial No. 293,989, filed June 17, 1952, but includes additional features, which will be pointed out hereafter.

The Williams instrument is of the type, in which a pair of beams of radiation travel along separate paths containing media differing in absorptivity and fall upon detecting means. Such instruments necessarily operate with unequal transmission of energy along the two paths and the Williams instrument is provided with means for nulling the detector at one operating point by means of a third beam of radiation, which bypasses the sample to be examined and falls upon the detector coincidentally with the weaker of the first two beams. When the instrument is in operating condition with the detector nulled by the third beam, the introduction of the sample results in the detector producing a signal.

The new analyzer uses three beams of radiation in the manner, in which they are used in the Williams instrument, and is provided with a detector, which produces a phase sensitive electrical signal, and means, which respond to that signal by varying the intensity of the third beam in such manner that the signal is automatically reduced to zero. The regulation of the amount of energy transmitted to the detector by the third beam is accomplished by adjusting a trimmer for that beam, and means are provided for producing a response corresponding to the adjustment of the trimmer required to reduce the phase sensitive signal from the detector to zero. Such response may then be employed in operating a recorder, an indicator, an alarm, etc. In the new instrument, changes occurring in the course of time in the detector and in the gain in the amplifying means employed have no effect on the calibration of the recorder, and the instrument is thus more accurate than prior similar instruments.

Instruments embodying the invention may be used for various purposes and a typical instrument is the infrared gas analyzer of the nondispersion type shown in the accompanying drawings, in which Fig. 1 is a longitudinal horizontal sectional schematic view of an instrument embodying the invention and utilizing infrared radiation;

Fig. 2 is an elevational view of the chopping device;

Fig. 3 is an elevational view of a manually operated trimmer;

Fig. 4 is a view, partly in vertical elevation and partly in section, of the nulling trimmer of the instrument;

Fig. 5 is a schematic view of a modified form of instrument embodying the invention;

Fig. 6 is an elevational view of the chopper disc used in the instrument of Fig. 5; and Fig. 7 is a schematic view of another modified form of the new instrument.

In the instrument shown in Fig. 1, the source of radiation is a heated coiled filament 10 bent to circular form and made of a suitable material, such as nichrome. The filament is supported on an annular mounting 11 of insulating material and lies within a housing generally designated 12, which includes a concave end section 13 having a highly polished inner surface 13a for multiple reflections of the radiation emitted by the filament. The filament is supplied with current through leads 14 extending out of the housing. The housing is constructed to provide three divergent passages 15, 16, and 17 for beams of radiation traveling away from the filament and the housing is made gas-tight by windows 15a, 16a, and 17a at the ends of the respective passages. Windows 15a, 16a, and 17a and all other windows employed in the instrument are made of infrared transmitting materials, such as suitable crystals.

The beam issuing through window 15a enters a cell 18 made of a metal tube closed at its opposite ends by an entrance window 19 and an exit window 20, and the cell has a gas inlet 21 containing a valve 22. The beam leaving cell 18 through the exit window 20 enters a cell 23 made of a metal tube closed at one end by an entrance window 24 and at the other by an exit window 25, and the cell is provided with a gas inlet 26 containing a valve 27. The radiation issuing through window 25 enters a passage 28 in a filter cell generally designated 29 through an entrance window 29a.

The radiation leaving passage 16 through the window 16a enters a cell 30 made of a metal tube closed at one end by an entrance window 31 and at the other by an exit window 32 and the cell has a gas inlet 33 provided with a valve 34. The radiation leaving cell 30 through window 32 enters the sample cell 35, which is made of a metal tube closed at one end by an entrance window 36 and at the other by an exit window 37. Cell 35 has a gas outlet 38 provided with a valve 39 and is connected to cell 23 by a tubular connection 40. Cells 23 and 35 together form a two-part sample cell and, in the use of the instrument, the mixture to be analyzed enters cell 23 through inlet 26, travels lengthwise through the cell, and then passes through connection 40 into cell 35, from which it leaves through the outlet 38. Preferably, inlet 26 and outlet 38 are at one end of the sample cell and connection 40 at the other, so that good flushing of the cell may be obtained and the development of stagnation points avoided. The radiation leaving cell 35 through window 37 enters passage 41 in filter cell 29 through the entrance window 42.

Radiation leaving passage 17 through window 17a enters a cell 43 through entrance window 44 closing one end of the cell. The other end of cell 43 is closed by a window 45 and the cell has a gas inlet 45a with a valve 45b. Radiation leaving cell 43 through window 45 enters a passage 46 in filter cell 29 through entrance window 47.

The filter cell 29 is provided with a gas inlet 48 having a valve 49. The converging beams of radiation traveling through passages 28, 41, and 46 in the filter cell enter the radiation receiving chamber 50 of a detector through an entrance window 51.

The detector illustrated is of the selective type and measures radiation intensity by selective absorption by a gas with which a radiation receiving chamber of the detector is filled. Such energy absorption results in a pressure rise which produces an electrical variable, and, in the detector shown, the pressure rise actuates thin flexible membranes forming the movable plates of condensers connected in parallel, so that the electrical variable is a change in capacity. Static pressure differentials on opposite faces of each membrane are prevented by a capillary connecting the spaces on opposite sides of the membrane and only pressure fluctuations in a narrow range about the chopping frequency are measured.

The radiation receiving chamber of the detector is illustrated diagrammatically as including a central compartment 52 and outer compartments 53, 54 on opposite sides thereof. The compartments 52 and 53 are separated by a thin flexible metallic membrane 55 and a similar membrane 56 separates compartments 52 and 54. The compartments are connected by a three-way connection 57 controlled by a valve 58 of such construction that all three compartments may be opened to one another or shut off from one another. A line 59 containing a valve 60 is connected to valve 58, so that, by opening valves 58 and 60, the three compartments may be evacuated, filled with gas at the same pressure, and then shut off from each other. A fixed plate 61 is mounted in compartment 53 is closely spaced relation to membrane 55 and, with that membrane, forms a variable condenser, and a fixed plate 62 in compartment 54 cooperates with membrane 56 to form another variable condenser. The membranes are connected to a line 63 and the plates are connected to a line 64, so that the two condensers are in parallel.

The passage 15, the cells 18 and 23, and the passage 28 define one path for a beam of radiation traveling from the source to the detector and this path may be referred to for convenience as the "analysis" path. The passage 16, the cells 30 and 35, and the passage 41 together define a second path, referred to as the "reference" path, and the passage 17, the cell 43, and the passage 46 together define a third path, referred to as the "nulling" path. A manually adjustable trimmer 65 is mounted in each path and the trimmer takes the form of a metal plate, which can be moved in or out of the beam by an adjusting screw 65a (Fig. 3) to vary the intensity of the beam. The inner walls of the passages and cells are all highly polished for multiple reflections, but, if desired, such polishing may be dispensed with provided a focused optics system is used.

The beams traveling along the three paths are periodically interrupted at a low frequency, for example, from 3 to 20 cycles per second, by a chopper disc 66 (Fig. 2) mounted on a shaft 67 carrying a pulley 68 driven by a motor 69 through a belt 70. The disc operates in the spaces between windows 15a and 19, 16a and 31, and 17a and 44 and the disc is so formed and the radiation paths so disposed at the chopping plane that, as the disc rotates, it interrupts the analysis and nulling beams in unison and interrupts the reference beam out of phase with the other two.

The intensity of the beam of radiation traveling along the nulling path is controlled by a nulling trimmer 71 extending into the beam between windows 17a and 44 and lying at one side of the chopping disc. This trimmer may conveniently take the form of an annular strip of metal 72 (Fig. 4) supported by a radial arm 73 on a shaft 74, the strip having a width increasing from a minimum to a maximum with the edges of the strip symmetrical with respect to a circle concentric with shaft 74. The instrument functions within a pre-determined range set by the length of the sample cell and the taper in width of the nulling trimmer.

The lines 63, 64 leading, respectively, from the membranes 55, 56 and plates 61, 62 of the condensers within the heat receiving chamber of the detector lead to a pre-amplifier 75, which converts minute capacitance change into voltage change and may be an electrometer circuit or one of several well-known oscillator circuits. The voltage output from the pre-amplifier is amplified by an A. C. amplifier 76, and the A. C. output from amplifier 76 passes to a phase sensitive rectifier 77, which may be a mechanical breaker assembly or a generator and ring diode combination. The rectifier illustrated is of the latter type and the generator 78 is driven in synchronism with the chopper by being operated from the chopper shaft 67.

In the operation of the instrument with the beams being chopped, the variable condensers controlled by the pressure-actuated membranes in the heat receiving chamber of the detector produce phase sensitive information in the form of capacity changes, whenever the amount of energy in the reference beam differs from the total amount of energy in the analysis and nulling beams. Such phase sensitive information issues from the pre-amplifier in the form of a phase sensitive A. C. signal, which is amplified in the A. C. amplifier 76. The output of the amplifier is then rectified in rectifier 77 in such manner that the output of the rectifier is a voltage of a polarity, which depends on whether the amount of energy transmitted along the reference path was greater than the total amount of energy transmitted along the analysis and nulling paths, or vice versa.

The polarized voltage from the phase sensitive detector is smoothed by filter 79 and is then fed to a servo amplifier 80, the output of which is supplied to a servo motor 81. The servo amplifier and servo motor are so constructed that the shaft of the motor will rotate in one direction or the other depending on the polarity of the voltage supplied by the phase sensitive rectifier 77 to the servo amplifier 80. The shaft of the servo motor 81 carries a pinion 82 meshing with a gear 83 on shaft 74 of the nulling trimmer 71 and shaft 74 is connected to the moving member of a position indicating slide wire device generally designated 84. This device is part of a circuit delivering an electrical signal corresponding to the position of the nulling trimmer 71, and is essentially a rotation-voltage transducer, which enables accurate indication of the position of the trimmer. The output of the slide wire device is passed through lines 85, 86 to a filter 87, which permits operation at acceptable noise levels, and the filtered voltage may then be used for operating a recorder 88 or like device.

In setting up the instrument for the analysis of a mixture containing the gas of interest and an interfering component, the three compartments of the heat receiving chamber of the detector are filled with the gas of interest at a predetermined pressure which gives maximum detector sensitivity, such pressure being generally something less than atmospheric pressure. The cell 43 is filled with a non-interfering gas and preferably one which is infrared non-absorbing, after which the nulling path through cell 43 is blanked off by its trimmer 65. The filter cell 29 is then either evacuated or filled with a non-absorbing gas through line 48 and valve 49 is closed, and the cells 18, 30 and the sample cell made up of parts 23 and 35 are either evacuated or filled with a non-absorbing gas, as preferred. With the source 10 and chopper 66 functioning and the detector 50, pre-amplifier 75, and A. C. amplifier 76 in normal operation, the manual trimmer 65 in the reference path is adjusted, until the signal at the output of the A. C. amplifier is reduced to zero, and the trimmer is then locked in position. The analysis and reference paths now transmit equal amounts of energy from the source to the detector.

The cell 18 in the analysis path is next filled with the gas of interest preferably to atmospheric pressure to serve as a sensitizing cell and, thereafter, the interfering component is introduced at a partial pressure into cell 30 lying in the reference path and serving as a compensating or filtering cell. The partial pressure of the interfering component to be introduced into the compensating cell 30 must be determined by trial, but a partial pressure of this gas usually can be found, at which the instrument is compensated, so that it does not respond appreciably to changes in the concentration of the interfering component present in the mixture to be analyzed. After the instrument has been compensated as described, the nulling trimmer 71 is adjusted, so that a given point thereon, for example, mid-scale, lies in the nulling path and the servo motor is shut off. A known sample, which may be the average composition of the mixture to be analyzed, is then introduced into the sample cells 23, 35, and the manual trimmer 65 in the nulling path is adjusted, until a zero signal results at the output of the A. C. amplifier. The instrument has now been brought to null condition for the standard sample and that sample is removed.

The servo motor 81 is then turned on, and the unknown mixture is introduced into the sample cell 23, 35. Any variation in the amount of the gas of interest in the mixture from the amount of that gas in the standard sample at once produces a phase sensitive signal at the output of the A. C. amplifier and the phase sensitive rectifier rectifies the signal and produces a voltage of one polarity or the other, depending upon whether more energy was transmitted to the detector along the reference path or along the analysis and nulling paths. The polarized voltage is filtered and supplied to the servo amplifier, the output of which is passed to the servo motor and causes that motor to rotate the trimmer in one direction or the other, depending on the polarity of the voltage supplied to the servo amplifier, to vary the intensity of the beam traveling along the nulling path. The motor continues in operation until the output from the A. C. amplifier is reduced to zero and the adjustment of the trimmer required to produce this result results in the production by the position indicating slide wire device of a voltage, which is supplied to the recorder. The value of such voltage is a measure of the amount of the gas of interest present in the mixture being analyzed and the recorder is actuated by the voltage to record the amount of the gas of interest.

In some cases, compensation of the instrument by introduction of the interfering component into the compensating cell 30 cannot be exactly achieved and, in such instances, the effect of a departure from exact compensation can be reduced by introducing some of the interfering component into the filter cell 29. The presence of the filter gas in cell 29 reduces the radiation intensity in the overlap region and reduces the unwanted signal. Where such filtering is required, the filter gas is introduced into cell 29 prior to the start of the procedure employed in compensating.

In the instrument illustrated in Fig. 1, the detector includes a single chamber 50 for receiving radiation and the radiation paths are so arranged and the chopping disc 66 is of such form that the chamber receives radiation transmitted by the reference beam alternately with the total amount of radiation transmitted by the analysis and nulling beams. If desired, other forms of detector may be used, such as that shown in the instrument of Fig. 5.

The Fig. 5 instrument is illustrated diagrammatically as including a source 89 in the form of a heated filament mounted in a housing 90 found to provide three passages 91, 92, 93 for beams of radiation. The beam in passage 91 travels along a reference path, including a compensating or filtering cell 94 similar in purpose and function to cell 30, one part 95a of a two-part sample cell 95, and one part 96a of a two-part filter cell 96, and then enters a radiation receiving chamber 97. The beam in passage 92 travels along an analysis path including a sensitizing cell 98 similar in purpose and function to cell 18, cell 95b connected to cell 95a and forming the second part of the sample cell 95, and cell 96b connected to cell 96a and forming the second part of filter cell 96. The analysis beam then enters radiation receiving chamber 99. The beam in passage 93 travels along a nulling path including a cell 100 and part 96b of the filter cell 96, and enters chamber 99.

The chambers 97 and 99 contain the gas of interest at a suitable pressure and are connected through respective connections 101, 102 to chamber 103 on opposite sides of a flexible metal membrane 104, which cooperates with a fixed plate 105 to form a variable condenser. Static pressure differentials across the membrane are eliminated by a capillary connection 106 between chambers 97, 99. The membrane and plate are connected by lines 107, 108 to a preamplifier 109.

The beams traveling along the three paths are periodically interrupted by a chopper disc 110 similar to disc 66, but the passages in housing 90 and the cells forming the paths are so arranged that the radiation is chopped in a cycle, in which all beams are simultaneously interrupted and then are simultaneously passed. As a result, the radiation in the reference beam enters chamber 97 at the same time that the radiation in the analysis and nulling beams is entering chamber 99. The beams entering the chambers cause a rise in pressure in each chamber and the pressures in the chambers act on opposite faces of the membrane to produce a change in capacity of the variable condenser formed by the membrane and the fixed plate. The capacity changes corresponding to the differences in the pressure rises in the chambers are phase sensitive and are converted into voltage changes in the pre-amplifier. The output of the pre-amplifier is a phase sensitive electrical signal which is utilized in the same manner as the signal produced by the pre-amplifier 75 in the instrument shown in Fig. 1; that is, the signal is amplified in the A. C. amplifier 111 and rectified in the phase sensitive rectifier 112. The output of the rectifier is a polarized voltage, the polarity of which depends on whether the energy in the reference beam was greater than the total amount of energy in the analysis and nulling beams, or vice versa. After being smoothed by filter 113, the polarized voltage is fed to a servo amplifier 114, the output of which is supplied to a servo motor 115. The servo motor operates in the same manner as servo motor 81, rotating in one direction or the other, depending on the polarity of the voltage supplied by the phase sensitive rectifier 112 to the servo amplifier 114.

The servo motor operates through gearing 116 to drive the shaft 117 of a nulling trimmer 118 lying in the path of the nulling beam and similar in purpose and function to the nulling trimber 71. Shaft 117 also operates the moving member of a position indicating slide wire device, generally designated 119 and forming part of a circuit delivering an electrical signal corresponding to the position of the nulling trimmer 118. The output of the slide wire device is passed to a filter 120 and the filtered voltage may then be used for operating a recorder 121 or like device.

In the instrument shown in Fig. 1, the chopper 66 causes the chamber 50 to receive radiation transmitted along the reference path in alternation with radiation transmitted simultaneously along the analysis and nulling paths and the membranes and fixed plates within chamber 50 produce phase sensitive information. In the Fig. 5 instrument, the use of the chopper causes the membrane 105 to respond to differential pressure fluctuations in a narrow frequency range about the chopping frequency and phase sensitive information is again produced.

The instrument shown in Fig. 7 is similar to that shown in Fig. 5, except that a different form of detector is employed, and the parts of the Fig. 7 instrument, which are the same as those in the instrument of Fig. 5, are identified by the same reference characters, to which prime marks have been added. In the instrument of Fig. 7, the detector includes a radiation receiving chamber 122 for the reference beam and the chamber contains an inner compartment 123 closed at one end by a flexible metallic membrane 124. The membrane separates compartment 123 from an outer enclosing compartment 125 and the two compartments are connected by a capillary connection 126 to avoid static pressure differentials on opposite faces of the membrane. The membrane cooperates with a fixed plate 127 to form a variable condenser. The detector includes a second radiation receiving chamber 128 having an inner compartment 129, which receives the radiation in the analysis and nulling beams and is closed at one end by a thin flexible metallic membrane 130. Compartment 129 lies within an outer compartment 131 containing a fixed plate 132 cooperating with the membrane to form a variable condenser, and the two compartments are connected by a capillary connection 133.

The variable condensers in the chambers 122, 128 are connected in a conventional subtraction network indicated at 134, and the output from the network passes to a pre-amplifier 135, the output of which is a phase sensitive electrical signal. The signal is amplified in the A. C. amplifier 136 and delivered to a servomotor 137, which rotates in one direction or the other, depending on the phase of the signal, which, in turn, depends on whether more radiation was transmitted by the reference beam than the total amount of radiation transmitted by the analysis and nulling beams, or vice versa. The servomotor operates through gearing 116' to drive the shaft 117' of a nulling trimmer 118' in the nulling path, and shaft 117' also operates the moving element of a position indicating slide wire device 119'. The output from the slide wire device is filtered in filter 120' and employed in any desired way, as, for example, to operate recorder 121'. Instead of employing the subtraction network shown in Fig. 7, the instrument may employ an addition network with a chopper of appropriate form.

The methods of setting up and utilizing the instruments of Figs. 5 and 7 in analytical work are the same as those described in connection with the instrument of Fig. 1.

It is to be understood that the position indicating slide wire combination employed in the three forms of instrument illustrated and described, it is not necessarily a proportional device. The absorption of radiation by the component of interest is not a linear function of concentration. Accordingly, when a recorder is employed, it may sometimes be desirable to make use of a non-linear slide wire of such construction that the relation between the recorder scale and the concentration of the component of interest in the sample is linear. The electrical network associated with the slide wire may be any one of several well-known networks, and may be either A. C. or D. C., as desired.

The nulling trimmer, such as trimmer 71, is illustrated as having a tapering width with its edges symmetrical with respect to a circle concentric with its shaft. When the taper in width is slight, one edge of the trimmer may be circular and the opposite edge formed to provide the taper. Also, in some cases, it may be desirable to form the trimmer of non-uniform taper.

The choppers disc, such as disc 66, are ordinarily made of opaque material but, for some purposes, the disc may be made of a known material having the characteristic of transmitting radiation above a specific wavelength only.

The instruments illustrated and described are for use in the infrared field and, when ultra violet radiation is to be employed, an appropriate source will be used and obvious changes will be required in the window materials and the detector.

The novel features, such as the detector shown in Fig. 1, which are disclosed but not claimed herein, form no part of the present invention and are disclosed and claimed in the co-pending application of Elliot Woodhull, Ser. No. 334,144, filed January 30, 1953, or in the co-pending application of Woodhull, Borden, and Montpas, Ser. No. 334,143, filed January 30, 1953.

We claim:

1. In a radiation instrument including means for causing beams of radiation to travel along two different paths, the second beam being weaker than the first, and means for causing a third beam to travel along a path different from the first two paths, the combination of means for interrupting the beams periodically, the second and third beams being interrupted simultaneously, detecting means acting in response to radiation in the beams falling thereon to produce a phase sensitive electrical signal, adjustable means for varying the intensity of the third beam, means acting in response to said phase sensitive signal to adjust said intensity varying means to cause said signal to be reduced to zero, and means actuated by said adjusting means and producing a response corresponding to the adjustment of said intensity varying means.

2. In a radiation instrument including means for causing beams of radiation to travel along two different paths, the second beam being weaker than the first, and means for causing a third beam to travel along a path different from the first two paths, the combination of means for interrupting the beams periodically, the second and third beams being interrupted simultaneously, detecting means, including means receiving the radiation in the beams and producing an electrical variable and means converting the variable into a phase sensitive electrical signal, adjustable means for varying the intensity of the third beam, means acting in response to said phase sensitive signal to adjust said intensity varying means to cause said signal to be reduced to zero, and means actuated by said adjusting means and producing a response corresponding to the adjustment of said intensity varying means.

3. In a radiation instrument including means for causing beams of radiation to travel along two different paths, the second beam being weaker than the first, and means for causing a third beam to travel along a path different from the first two paths, the combination of means for interrupting the beams periodically, the second and third beams being interrupted simultaneously, detecting means, including means receiving radiation in the beams and producing capacity changes and means converting said capacity changes into a phase sensitive electrical signal, adjustable means for varying the intensity of the third beam, means acting in response to said phase sensitive signal to adjust said intensity varying means to cause said signal to be reduced to zero, and means actuated by said adjusting means and producing a response corresponding to the adjustment of said intensity varying means.

4. In a radiation instrument including means for causing beams of radiation to travel along two different paths, the second beam being weaker than the first, and means for causing a third beam to travel along a path different from the first two paths, the combination of means for interrupting the beams periodically, the second and third beams being interrupted simultaneously, detecting means acting in response to radiation in the beams falling thereon to produce a phase sensitive electrical signal, adjustable means for varying the intensity of the third beam, means operating in response to said signal and producing a voltage polarized in accordance with the phase of the signal, means operating in response to the polarity of said voltage to adjust said intensity varying means to cause said signal to be reduced to zero, and means actuated by said adjusting means and producing a response corresponding to the adjustment of said intensity varying means.

5. In a radiation instrument including means for causing beams of radiation to travel along two different paths, the second beam being weaker than the first, and means for causing a third beam to travel along a path different from the first two paths, the combination of means for interrupting the beams periodically, the second and third beams being interrupted simultaneously, detecting means acting in response to radiation in the beams falling thereon to produce a phase sensitive A. C. signal, means for amplifying said signal, means for rectifying the output of the amplifying means and producing a voltage of a voltage polarized in accordance with the phase of said signal, adjustable means for varying the intensity of the third beam, means operating in response to the polarity of said voltage to adjust said intensity varying means to cause said signal to be reduced to zero, and means actuated by said adjusting means and producing a response corresponding to the adjustment of said intensity varying means.

6. In a radiation instrument including means for causing beams of radiation to travel along two different paths, the second beam being weaker than the first, and means for causing a third beam to travel along a path different from the first two paths, the combination of means for interrupting the beams periodically, the second and third beams being interrupted simultaneously, detecting means acting in response to radiation in the beams falling thereon to produce a phase sensitive electrical signal, an adjustable trimmer for varying the intensity of the third beam, means acting in response to said phase sensitive signal to adjust said trimmer to cause said signal to be reduced to zero, said means including a servomotor connected to the trimmer, and means actuated by said adjusting means and producing a response corresponding to the adjustment of said intensity varying means.

7. In a radiation instrument including means for causing beams of radiation to travel along two different paths, the second beam being weaker than the first, and means for causing a third beam to travel along a path different from the first two paths, the combination of means for interrupting the beams periodically, the second and third beams being interrupted simultaneously, detecting means acting in response to radiation in the beams falling thereon to produce a phase sensitive electrical signal, adjustable means for varying the intensity of the third beam, means acting in response to said phase sensitive signal to adjust said intensity varying means to cause said signal to be reduced to zero, and means actuated by said adjusting means and producing a voltage related to the adjustment of said intensity varying means.

8. In a radiation instrument including means for causing beams of radiation to travel along two different paths, the second beam being weaker than the first, and means for causing a third beam to travel along a path different from the first two paths, the combination of means for interrupting the beams periodically, the second and third beams being interrupted simultaneously, detecting means acting in response to radiation in the beams falling thereon to produce a phase sensitive electrical signal, adjustable means for varying the intensity of the third beam, means acting in response to said phase sensitive signal to adjust said intensity varying means to cause said signal to be reduced to zero, means actuated by said adjusting means and producing a voltage corresponding to the adjustment of said intensity varying means, and recording means operated by said voltage.

9. In a radiation instrument including means for causing beams of radiation to travel along two different paths, the second beam being weaker than the first, and means for causing a third beam to travel along a path different from the first two paths, the combination of means for interrupting the beams periodically, the second and third beams being interrupted simultaneously, detecting means acting in response to radiation in the beams falling thereon to produce a phase sensitive electrical signal, a trimmer for varying the intensity of the third beam, means acting in response to said phase sensitive signal to adjust the trimmer to cause said signal to be reduced to zero, and means actuated by said adjusting means and producing a response corresponding to the adjustment of the trimmer.

10. In a radiation instrument including means for causing beams of radiation to travel along two different paths, the second beam being weaker than the first, and means for causing a third beam to travel along a path different from the first two paths, the combination of means for interrupting the beams periodically, the second and third beams being interrupted simultaneously, detecting means acting in response to radiation in the beams falling thereon to produce a phase sensitive electrical signal, adjustable means for varying the intensity of the third beam, means acting in response to said phase sensitive signal to adjust said intensity varying means to cause said signal to be reduced to zero, and means, including a circuit containing a position indicating slide wire, operated by said adjusting means and producing a response corresponding to the adjustment of said intensity varying means.

11. In a radiation instrument including means for causing beams of radiation to travel along two different paths, the second beam being weaker than the first, and means for causing a third beam to travel along a path different from the first two paths, the combination of means for interrupting the beams periodically, the second and third beams being interrupted simultaneously and out of phase with the first beam, detecting means, including a radiation receiving chamber receiving all the beams, said detecting means acting in response to radiation in the beams to produce a phase sensitive signal, adjustable means for varying the intensity of the third beam, means acting in response to said phase sensitive signal to adjust said intensity varying means to cause said signal to be reduced to zero, and means actuated by said adjusting means and producing a response corresponding to the adjustment of said intensity varying means.

No references cited.